United States Patent [19]

Horbal et al.

[11] 4,078,484
[45] Mar. 14, 1978

[54] AUTOMATIC ACTUATOR FOR NORMALLY MANUALLY OPERABLE SELECTOR ELEMENTS

[75] Inventors: John J. Horbal, Beacon Falls; William J. Casey, Milford, both of Conn.

[73] Assignee: Rockaway Corporation, Rockaway, N.J.

[21] Appl. No.: 684,642

[22] Filed: May 10, 1976

[51] Int. Cl.² .............................................. B41J 1/22
[52] U.S. Cl. ........................................ 101/45; 197/19; 101/110; 340/365 S; 101/91
[58] Field of Search ..................... 101/91, 45, 46, 110; 197/19-20, 49, 98; 340/365 S, 365 L; 177/10, 13; 346/9, 10, 40

[56] References Cited

U.S. PATENT DOCUMENTS

| | | | |
|---|---|---|---|
| 1,302,181 | 4/1919 | Lamar | 197/19 |
| 1,753,991 | 4/1930 | Langford | 197/19 |
| 3,340,985 | 9/1967 | Sinila | 197/19 |
| 3,606,833 | 9/1971 | Deutsch | 101/45 |
| 3,709,144 | 1/1973 | Sims | 101/45 |
| 3,824,922 | 7/1974 | Van Auker | 101/45 |
| 3,882,773 | 5/1975 | Cook et al. | 101/110 |
| 3,977,320 | 8/1976 | Lupkas et al. | 101/110 |

Primary Examiner—Edward M. Coven
Attorney, Agent, or Firm—Pasquale A. Razzano

[57] ABSTRACT

Apparatus for automatically actuating manually operable selector elements, such as the type which normally are found on a manually operable postage meter. A carriage is provided and is movable between an initial, start position and an end position. Plural actuator elements are coupled to and movable with the carriage. These actuator elements are positioned in operable relation with the selector elements and are selectively energized while the carriage moves between its start and end positions to correspondingly activate the selector elements. When used in the environment of a postage meter, the selective energization of the actuator elements thereby conditions the postage meter to provide a corresponding indication of postage. Reset apparatus resets the carriage following the selective energization of the actuator elements. With minor changes in the structure of the actuator elements, the automatic actuator can be used in conjunction with, for example, postage meters of the type having movable levers selectively positioned to establish corresponding monetary units of postage, or an array of columns of depressible keys, each key corresponding to any one of the possible monetary units of postage.

31 Claims, 7 Drawing Figures

AUTOMATIC ACTUATOR FOR NORMALLY MANUALLY OPERABLE SELECTOR ELEMENTS

BACKGROUND OF THE INVENTION

This invention relates to an apparatus for automatically actuating normally manually operable selector elements and, more particularly, to automatic actuating apparatus finding particular application for use with manually operable postage meter devices.

The development of automatic postage scales has resulted in rapid, accurate determination of postage in the shipment of articles. Typically, an operator merely enters, for example, via a keyboard, the destination of the article to be shipped and its class of shipment. When the article is weighed, these parameters are taken into account to automatically determine the postage for that article which is to be shipped via the selected class of shipment to the selected destination. Thus, such automatic postage scales can be operated easily by relatively untrained personnel. A typical example of one advantageous automatic postage scale is described in detail in copending application Ser. No. 652,843, assigned to the assignee of the present invention.

In the aforementioned application, and as is typical in other automatic postage scales, the computed postage is displayed in monetary units, such as dollars and cents, requiring that an additional step be carried out so that the corresponding postage is affixed to the article. Typically, such postage is derived by the operation of certified postage meters. Heretofore, such derivation of the postage has been obtained by the manual operation of the postage meter. For example, in a conventional postage meter manufactured by Pitney-Bowes Corp., Stamford, Conn., selected levers must be manually moved into positions representing the monetary units of the required postage, as indicated by the automatic postage scale display. Then, a suitable postage notation, such as a printed label, or the like, is produced.

Relying upon an operator as the intermediary to derive the postage indication determined by the automatic postage scale often results in erroneous postage affixed to the article to be shipped. Furthermore, for those facilities wherein the postage scale is situated at one location and the postage meter at another location, additional means must be provided to insure that the postage meter is operated correctly and in accordance with the determined postage for each particular article. Consequently, in this type of facility, the possibility of error is significantly increased.

Therefore, there has been a long-felt need for automatic postage meters which are controlled in conjunction with automatic scales. However, because there are relatively few manufacturers of postage meters, it generally is difficult to integrate the automatic postage scale and postage meter into a fully automated device.

OBJECTS OF THE INVENTION

Therefore, it is an object of the present invention to provide an automatic actuator which can be mechanically affixed to a conventional postage meter to automatically operate that meter under the control of postage data computed by, for example, an automatic postage scale.

Another object of this invention is to provide an automatic actuator which can be modified in only minor respects so as to be usable with various postage meters produced by different manufacturers.

A further object of this invention is to provide an automatic actuator which can be used with, for example, a postage meter, the automatic actuator being controlled by a remotely-positioned automatic postage scale.

An additional object of this invention is to provide improved apparatus for automatically actuating manually operable selector elements, such as the selector elements on a manually operable postage meter.

Various other objects, advantages and features of this invention will become readily apparent from the ensuing detailed description, and the novel features will be particularly pointed out in the appended claims.

SUMMARY OF THE INVENTION

In accordance with the present invention, broadly, apparatus is provided for automatically actuating manually operable selector elements and, more particularly, an automatic actuator is provided for use with a manually operable postage meter, or the like, the automatic actuator including a movable carriage, plural actuator elements coupled to and movable with the carriage so as to correspondingly operate the selector elements thereby to condition the postage meter to provide a corresponding indication of postage, and reset apparatus to reset the automatic actuator to an initial position after a corresponding postage notation has been produced. Preferably, the automatic actuating apparatus is used in conjunction with postage data supply means, such as an automatic postage scale, whereby the actuator elements are controlled as a function of the postage data computed by that scale.

In accordance with one advantageous feature of this invention, the postage meter with which the automatic actuator can be used may be of the type having individually positionable levers corresponding to the dollars and cents notation of the postage, or the postage meter may be of the type having an individual key element provided for each possible monetary unit of the postage.

BRIEF DESCRIPTION OF THE DRAWINGS

The following detailed description, given by way of example, will best be understood in conjunction with the accompanying drawings in which.

DETAILED DESCRIPTION OF CERTAIN ONES OF THE PREFERRED EMBODIMENTS

Figure 1:
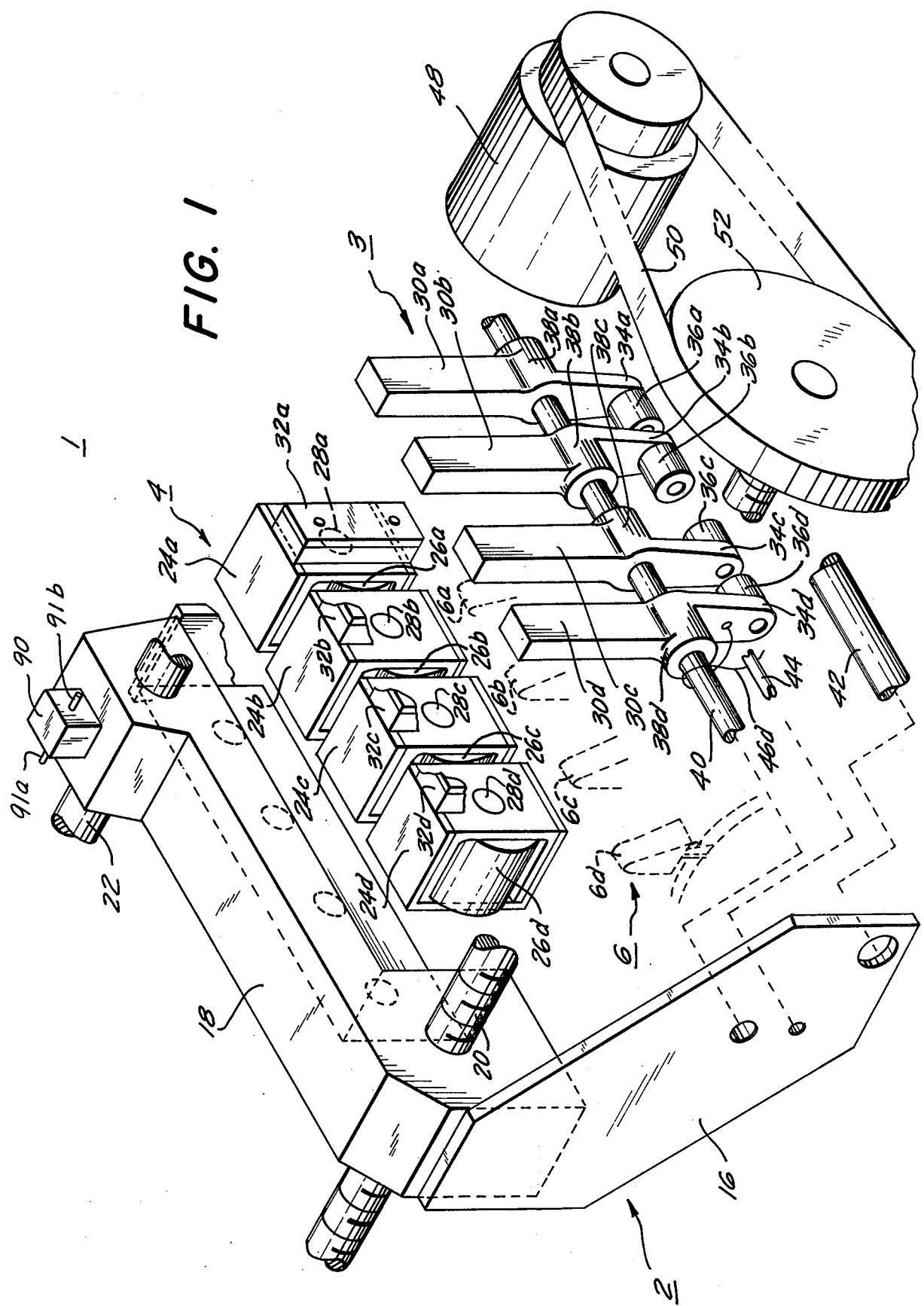
FIG. 1 is an exploded perspective view of the automatic actuator apparatus in accordance with one embodiment of the present invention.

Referring now to the drawings, wherein like reference numerals are used throughout, and in particular to FIG. 1, there is illustrated an exploded, perspective view of an automatic actuator 1 in accordance with one embodiment of the present invention. This automatic actuator apparatus can be used to actuate a normally, manually operated device under the control of, for example, suitable control data electrically supplied thereto. The advantageous features of the illustrated automatic actuator apparatus will best be appreciated by the following description wherein the apparatus is described in conjunction with a normally, manually operated postage meter 5. Typically, postage meter 5 is of the type having plural selector levers 6, each being independently movable to any one of multiple positions. Postage meter 5 may be of the type manufactured by Pitney-Bowes of Stamford, Conn. wherein selector lever 6a can be moved to select the units digit of, for example, the cents value of postage, selector lever 6b can be moved to select the tens digit of the cents value of postage, selector lever 6c can be moved to select the units digit of the dollars value of postage and selector lever 6d can be moved to select the tens digit of the dollar value of postage.

Figure 2:
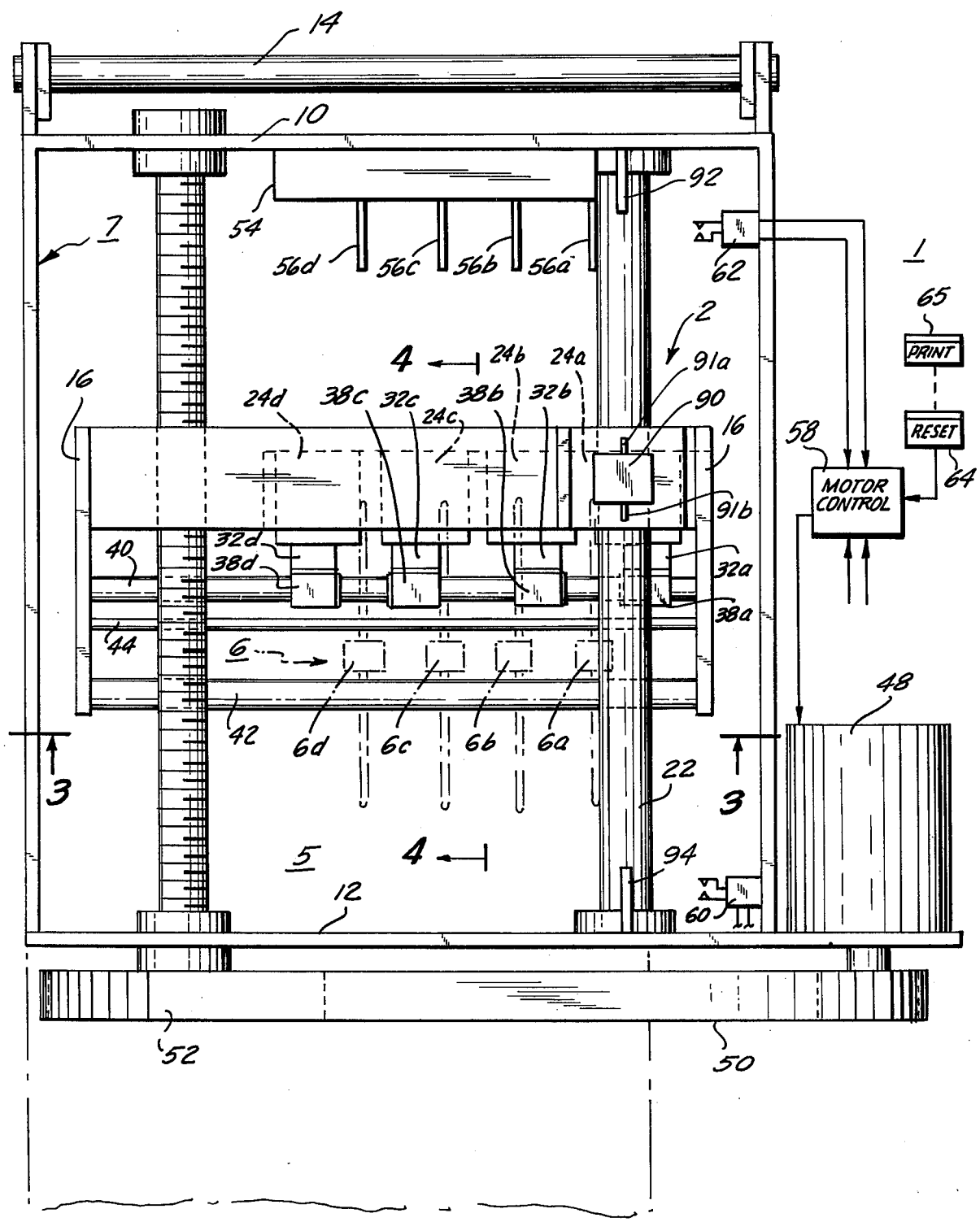
FIG. 2 is a top plan view of the automatic actuator apparatus shown in FIG. 1.

Automatic actuator apparatus 1 is comprised of a carriage 2 supported on a frame 7 which is adapted to be mounted upon postage meter 5, as shown more clearly in FIG. 2. The frame includes a rear end wall 10 and a front end wall 12 joined by side panels. As further shown in FIG. 2, frame 7 is pivotally mounted on a mounting member 14, the latter being secured to the base of postage meter 5.

As will soon be described in greater detail, carriage 2 is adapted to be driven from an initial start position located in the vicinity of rear end wall 10 to an end position located in the vicinity of front end wall 12 of frame 7. Carriage 2 supports activator elements 3 such that these activator elements move with the carriage. Activator elements 3 are adapted to selectively position each of selector levers 6a, 6b, 6c and 6d in preselected locations corresponding to the monetary units of a particular postage indication. Also supported on carriage 2 and cooperable with activator elements 3 are electromagnetic elements 4. The electromagnetic elements are selectively operated thereby to determine the operating condition of activator elements 3.

Now described in greater detail, carriage 2 is comprised of a pair of oppositely disposed side plates 16 having a transverse support block 18 therebetween. Support block 18 is drivingly coupled to a lead screw 20, the latter being bi-directionally rotatable so as to correspondingly drive carriage 2 in first and second opposite directions. The support block additionally is supported on a guide shaft 22, the guide shaft and lead screw being parallel and extending between rear and front end walls 10 and 12 of frame 7, as shown in FIG. 2. Thus, as lead screw 20 is driven, carriage 2 correspondingly is moved along the surface of postage meter 5.

In the embodiment shown in FIG. 1, electromagnetic elements 4 are comprised of electromagnets 24a, 24b, 24c and 24d, all secured to support block 18 and each being individually energized by suitable control apparatus described hereinbelow. As one example thereof, each electromagnet 24 includes an energizable coil 26 having a central core 28. As is known, if coil 26 is supplied with, for example, a direct current, core 28 exerts a magnetically attractive force capable of attracting suitable material, such as a ferromagnetic element. Electromagnets 24a, 24b, 24c and 24d are associated with elongated members 30a, 30b, 30c and 30d, respectively, these elongated members comprising activator elements 3. Each elongated member includes a first end portion comprised of magnetically attractable material or, alternatively, secured to a magnetically attractable pad 32. Each elongated member 30 also includes a second, driving end portion 34 upon which a roller 36 preferably is mounted. Each roller 36a, 36b, 36c and 36d is adapted to drivingly engage an associated selector lever 6a, 6b, 6c and 6d, respectively, of postage member 5. An intermediate portion 38 of each elongated member 30 is pivotally mounted on a pivot bar 40 which extends between side plates 16 of carriage 2.

Figure 3:
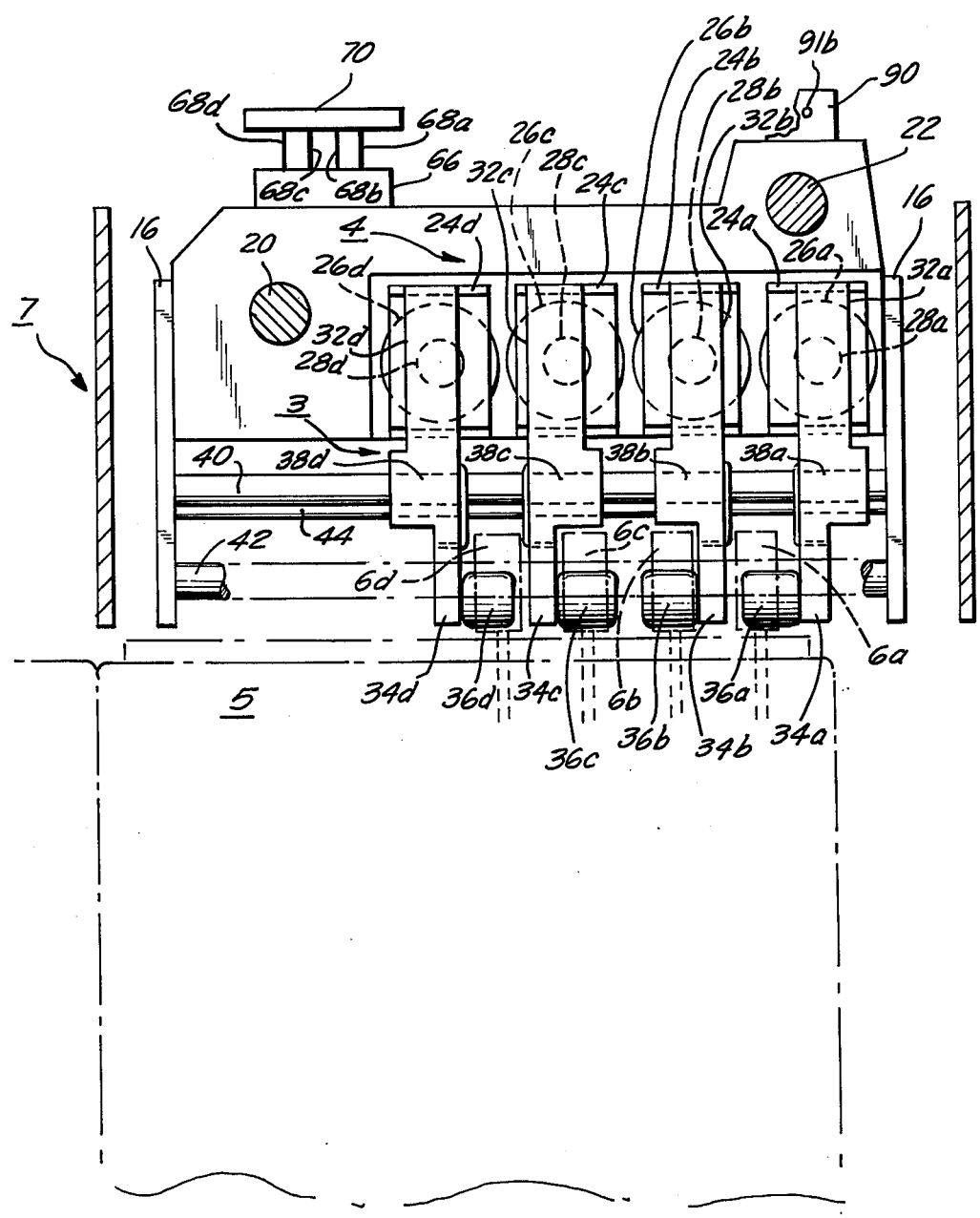
FIG. 3 is a sectional view taken along lines 3—3 in FIG. 2.
Figure 4:
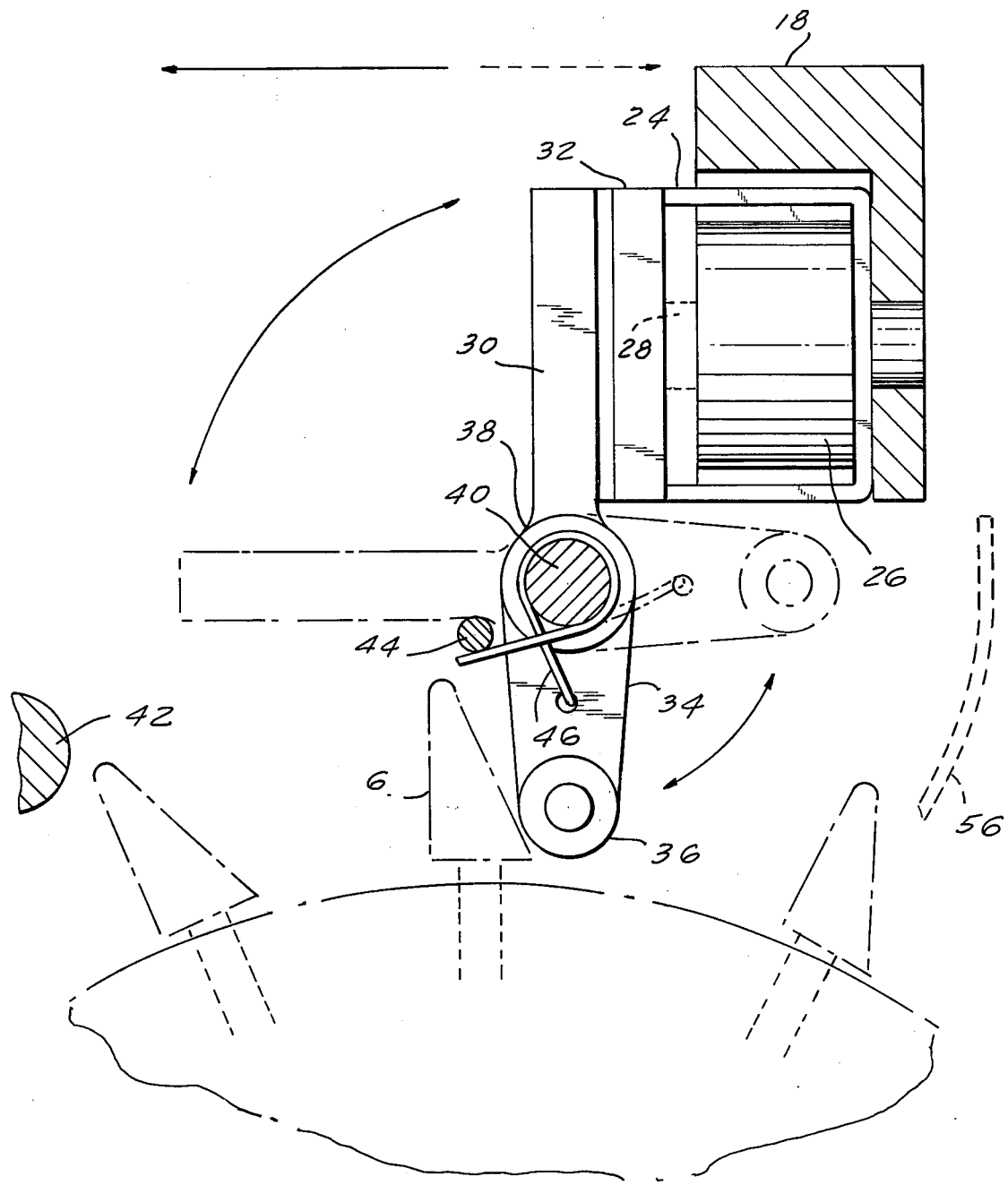
FIG. 4 is an enlarged sectional view taken along line 4—4 in FIG. 2.

As shown in FIGS. 2 and 3, and more clearly in FIG. 4, when an electromagnet 24 is energized, the magnetically attractable end portion 32 of its associated elongated member 30 is attracted thereto so as to maintain the elongated member in a lever-driving configuration. If postage meter 5 is supported on a horizontal plane such that its selector levers 6 extend in a generally vertical direction, the driving configuration of elongated member 30 may be considered to be substantially upright, as shown in FIGS. 1 and 4. Hence, if carriage 2 is driven from its start position toward its end position, roller 36 on each elongated member 30 will drive an associated selector lever 6 through each predetermined monetary unit position therefor on postage meter 5. The magnetic force exerted on magnetically attractive end portion 32 of elongated member 30 by its associated energized electromagnet 24 is greater than the counter force exerted on roller 36 by the mechanical resistance offered by selector lever 6. Hence, elongated member 30 will not pivot about pivot bar 40 and will remain in driving engagement with its selector lever to thereby push lever 6 through each monetary unit position. However, if electromagnet 24 is de-energized, the magnetic force no longer is exerted on magnetically attractive end portion 32 of elongated member 30 and, therefore, the resistive force exerted on roller 36 by lever 6 is sufficient to pivot elongated member 30 in the counterclockwise direction about pivot bar 40, as shown in FIG. 4. When this occurs, roller 36 is removed from driving engagement with its associated selector lever 6, and the selector lever no longer is pushed. Consequently, as carriage 2 continues to move, that particular selector lever 6 will remain in its last-obtained monetary unit position.

To insure that elongated member 30 pivots about pivot bar 40 when its associated electromagnet 24 is de-energized, and further to insure that, once pivoted, elongated member 30 does not bounce back to a driving, or upright, configuration, a bias bar 44 is provided between side plates 16, parallel to pivot bar 40 and juxtaposed intermediate portion 38 of elongated member 30. The purpose of bias bar 44 is to cooperate with a spring 46 which is wrapped about pivot bar 40 and which includes an end secured to elongated member 30. Spring 46 exerts a bias force on the elongated member which is overcome by the magnetic force exerted on magnetically attractive end portion 32 by electromagnet 24. Hence, when the electromagnet is de-energized, the bias force exerted by spring 46 is sufficient to prevent unwanted bounce of the elongated member. Nevertheless, spring 46 is optional and, if desired, may be omitted.

An electric motor 48 is coupled via drive belt 50 to a pulley 52, the latter being secured to lead screw 20. Preferably, motor 48 is a bi-directional motor capable of driving pulley 52, and thus lead screw 20, in either of opposite directions. Alternatively, separate motors may be provided for the respective carriage drive directions and a clutch arrangement may be used to couple the respective drive motors to the lead screw. The operation of motor 48 is controlled by a motor control circuit 58, shown in block diagram form in FIG. 2 and in schematic diagram in FIG. 6. Motor control circuit 58 is electrically connected to an end position normally closed limit switch 60 and to a start position normally closed limit switch 62. The respective contacts of limit switches 60 and 62 are positioned in the path of movement of one of side plates 16 of carriage 2. Hence, when carriage 2 is in its initial, start position, the contacts of start position limit switch are opened and, similarly, when carriage 2 is at its end position, the contacts of end position limit switch 60 are opened. It should be appreciated that the length of frame 7 and the positioning of limit switches 60 and 62 are such that the movement of carriage 2 from its start position to its end position is sufficient to drive selector levers 6 of postage meter 5 through each monetary unit position provided on the postage meter. Motor control circuit 58 also is connected to a reset switch 64 and, if desired, to a start switch (not shown).

When the contacts of limit switch 60 are closed, motor control circuit 58 is conditioned to energize motor 48 such that pulley 52 and lead screw 20 are rotated so as to drive carriage 2 from its start position toward its end position. When the carriage reaches its end position, the contacts of limit switch 60 are opened so as to deactivate motor 43. At the same time, motor control circuit 58 is conditioned to energize motor 48 in an opposite direction once reset switch 64 is operated. Accordingly, when the reset switch is operated, motor 48 rotates pulley 52 and lead screw 20 in an opposite direction so as to return carriage 2 from its end position to its start position. When the carriage reaches its start position, the contacts of limit switch 62 open to de-energize motor 48 and to condition motor control circuit 58 for a subsequent energization of the motor in the first-mentioned, or forward, direction. In order to control the direction in which motor 48 is driven, a direction-control switch 90 having forward and reverse actuating members 91a and 91b is mounted on support block 18. Abutment 92 is provided on rear end wall 10 and is adapted to abut member 91a to close switch 90 to a "forward" condition. Similarly, abutment 94 is provided on front end wall 12 and is adapted to abut member 91b to close switch 90 to a "reverse" condition. As described below, switch 90 is included in motor control circuit 58.

When carriage 2 is driven from its start position to its end position, elongated members 30a, 30b, 30c, and 30d drive, or push, selector levers 6a, 6b, 6c and 6d, respectively, of postage meter 5 so as to position these selector levers at respective monetary unit positions representing the postage to be indicated. Once its end position is reached and reset switch 64 is operated, carriage 2 and postage meter 5 are reset to their respective initial conditions. The reset apparatus used to carry out this reset function now will be described. A reset bar 42 extends between side plates 16 of carriage 2 and is in leading relation with respect to elongated members 30, as the carriage is driven forward from its start position to its end position. Reset bar 42 is adapted to engage each selector lever 6a, 6b, 6c and 6d when carriage 2 is returned to its start position so as to return concurrently all of the selector levers to their initial positions. If desired, reset bar 42 may be provided with sleeves in alignment with respective levers 6a, 6b, 6c and 6d to reduce wear during repeated use of the apparatus.

In addition, a reset support member 54 is mechanically secured to rear end wall 10 and is provided with projecting members 56a, 56b, 56c and 56d aligned with rollers 36a, 36b, 36c and 36d, respectively, of elongated members 30. It is recalled that, once a selector lever 6 reaches its proper monetary unit position, electromagnet 24 is de-energized and the force exerted on elongated member 30 by selector lever 6 pivots the elongated member to a substantially horizontal position, as shown in FIG. 4. When carriage 2 is reset, it is necessary to restore each elongated member 30 to its driving, or upright, configuration. Consequently, when carriage 2 is driven rearwardly from its end position to its start position, roller 36 of each pivoted member 30 contacts its associated projecting member 56 prior to the time that carriage 2 reaches its start position. As carriage 2 is driven further rearwardly, roller 36 slides along its associated projecting member 56 until its driving configuration is obtained once again. Thus, when the carriage is returned to its initial, start position, reset bar 44 resets all of selector levers 6a, 6b, 6c and 6d and projecting members 56a, 56b, 56c and 56d reset all of elongated members 30a, 30b, 30c and 30d to their driving, or upright, configurations. The actuator apparatus then is prepared for subsequent reuse to automatically actuate postage meter 5.

The manner in which electromagnets 24a, 24b, 24c and 24d are selectively operated so as to release their respective elongated members 30a, 30b, 30c and 30d when associated selector levers 6a, 6b, 6 i c and 6d have been driven to their predetermined monetary unit positions now will be described. Preferably, each electromagnet coil 26a, 26b, 26c and 26d is electrically connected individually to a brush assembly 66, shown in FIG. 3. In one embodiment thereof, brush assembly 66 is positioned atop support block 18. However, as will soon be appreciated, the brush assembly can be positioned at any suitable location on carriage 2. Brush assembly 66 includes movable contacts 68a, 68b, 68c and 68d which are electrically connected to electromagnet coils 26a, 26b, 26c and 26d, respectively. Movable contacts 68 are adapted to electrically engage stationary contacts which are supplied with suitable control signals to selectively operate the electromagnets when movable contacts 68 are in contact with appropriate ones of the stationary contacts. As one example thereof, stationary contacts 70 are comprised of individual segmented contacts formed of rows of individual contact elements 72a, 72b, 72c and 72d, shown in greater detail in FIG. 5, these contact elements being affixed to an insulated member. Each row of contact elements 72 is comprised of ten individual elements, each element being associated, and preferably aligned, with a monetary unit position for each of selector levers 6a, 6b, 6c and 6d. Thus, ten individual contact elements are included in row of contact elements 72a, which row is associated with selector lever 6a. Similarly, row of contact elements 72 is associated with selector lever 6b and is comprised of ten individual contact elements. Typically, contact elements $72a_0$, $72a_1$, . . . $72a_8$ and $72a_9$ are associated, or aligned, with the zero cents, 1 cent, . . . 8 cents and nine cents positions for selector lever 6a. There is, of course, a corresponding alignment between each contact element included in rows of contact elements 72b, 72c and 72d and the monetary unit positions of selector levers 6b, 6c and 6d, respectively. Therefore, it may be appreciated that, as carriage 2 moves from its start position to its end position, movable contacts 68a, 68b, 68c and 68d simultaneously traverse, or scan, the successive contact elements included in rows of contact elements 72a, 7b, 72c and 72d, respectively.

Although movable contacts 68 may be connected directly to electromagnet coils 26, it is preferred to provide coil-driving circuitry for each coil. As one example, a transistor 76a is provided to drive coil 26a in response to operating signals supplied to the transistor across a bias resistor 78a from movable contact 68a as the movable contact scans row of contact elements 72a. As is conventional, a damping diode 80a is connected in parallel with coil 26a. Also, a capacitor 82a is connected in parallel with coil 26a to prevent the coil from being de-energized when transistor 76a is momentarily turned off, as when movable contact 68a is between adjacent contact elements. A similar coil driving arrangement is provided for each of the remaining coils 26b, 26c and 26d.

In the embodiment illustrated in FIGS. 1-4, wherein electromagnet elements 4 are comprised of electromagnets 24, each coil 26 normally is energized so as to attract magnetically attractive end portion 32 of its associated elongated member 30 until the driven selector lever 6 reaches its predetermined monetary unit position. At that time, coil 26 is de-energized and elongated member 30 is released so as to pivot out of driving relation with its selector lever 6. This selective control over each of coils 26a, 26b, 26c and 26d is derived from the voltage potentials which are selectively applied to each of the contacts included in the rows of contact elements 72a, 72b, 72c and 72d, respectively. For example, let it be assumed that selector lever 6a is to be positioned at a location corresponding to a postage indication of nine cents. Accordingly, coil 26a is energized while carriage 2, and thus movable contact 68a, moves forwardly from its start position. Hence, if each of contact elements $72a_1, 72a_2, \ldots 72a_8$ is provided with a relatively higher voltage potential, these potentials are applied to transistor 76a to turn it on, while carriage 2 advances, and coil 26a remains energized. When the carriage reaches the position whereat the selector lever 6a is disposed at the nine cents location, movable contact 68a is in contact with contact element $72a_9$. If a relatively lower voltage potential is provided at contact element $72a_9$, transistor 76a is turned off and coil 26a is de-energized. Consequently, as carriage 2 continues to move forwardly, the resistive force exerted on elongated member 30a by lever 6a is sufficient to pivot that member out of driving relation with the lever. Hence, selector lever 6a remains at its nine cents location while carriage 2 continues to advance.

The remaining transistors 76b, 76c and 76d are similarly controlled to correspondingly energize coils 26b, 26c and 26d, respectively. It may be appreciated that the relatively lower voltage potential is supplied independently to any one particular contact element in each row of contact elements 72a, 72b, 72c and 72d. The manner in which the voltage potentials are applied to the contact elements now will be described.

Figure 5:
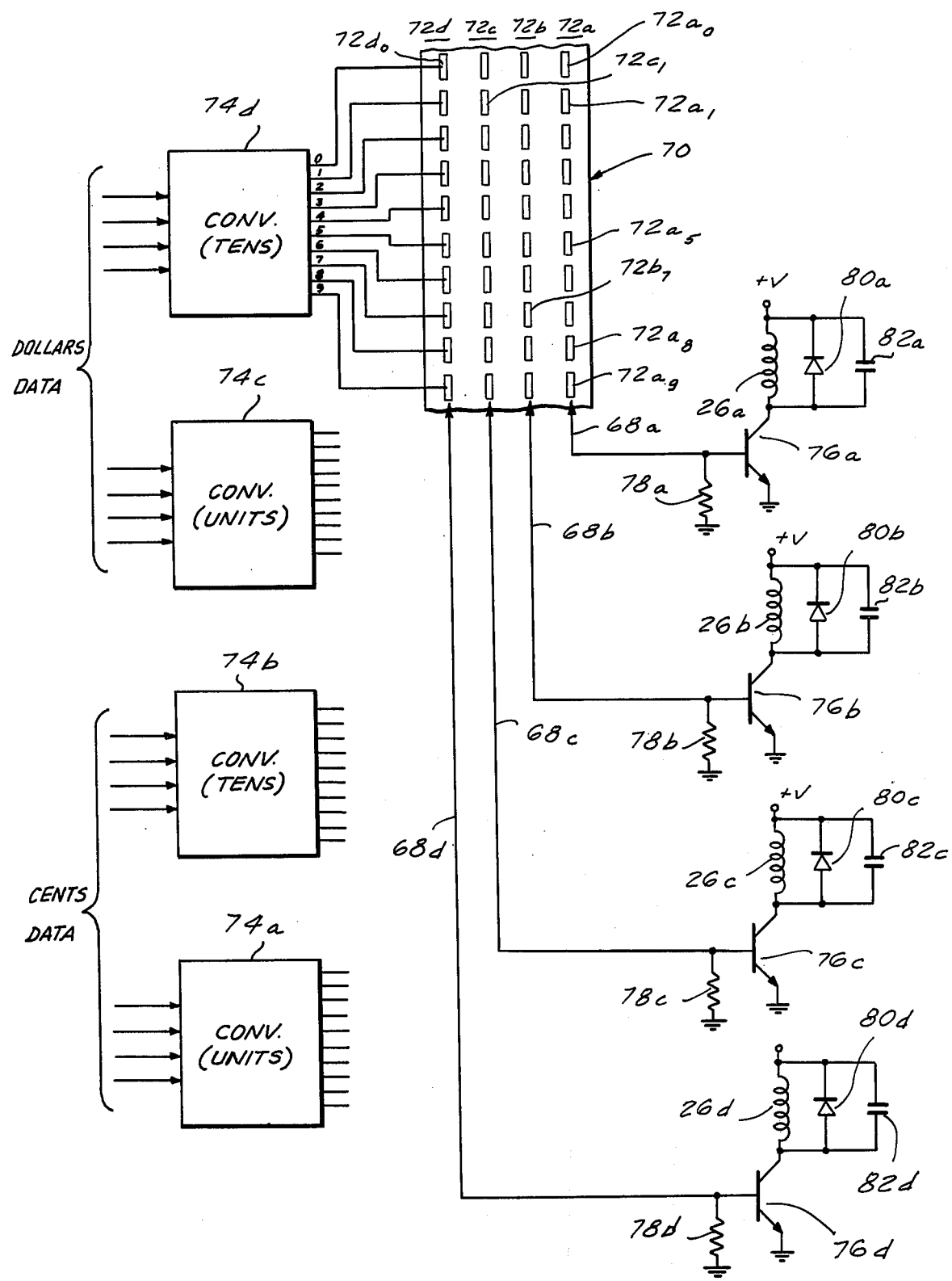
FIG. 5 is a schematic diagram of the control electronics included in the automatic actuator of the present invention.

It is recalled that the automatic actuator apparatus of this invention finds particular utility when used in conjunction with an automatic postage scale. A typical automatic postage scale is disclosed in copending application Ser. No. 652,843 and, in the interest of brevity, further description thereof need not be provided for a full understanding of the present invention. However, it should be noted that, in the typical automatic postage scale, postage data is represented in a digital code. That is, digital techniques are used to determine the correct postage for the article to be shipped, and this postage data normally is viewably displayed. The present invention is responsive to this digital representation of postage data to selectively apply the aforedescribed voltage potentials to contact elements 72. As shown in FIG. 5, digital converter circuits 74 are connected to receive the digitized postage data from the automatic postage scale (not shown). In one embodiment, the digitized postage data is supplied in BCD format divided into the units and tens portions of the cents notation of postage data and into the units and tens portions of the dollars notation of the postage data. Consequently, each converter circuit 74a, 76b, 74c and 74d is a binary-to-decimal converter having ten output terminals and which is adapted to supply, for example, a relatively low voltage potential to that decimal output terminal corresponding to the received BCD data. Thus, one decimal output terminal of each converter circuit 74a, 74b, 74c and 74d will be provided with a relatively low voltage potential and the remaining decimal output terminals will be provided with relatively higher voltage potentials. The respective decimal output terminals of converter 74a are connected to corresponding contact elements in the row of contact elements 72a, and a similar interconnection between decimal output terminals and contact elements is provided between converter circuits 74b, 74c and 74d and rows of contact elements 72b, 72c and 72d, respectively. Therefore, it is appreciated that, depending upon the postage data supplied to the converter circuits 74 by the automatic postage scale, a predetermined one contact element in each row of contact elements 72 is supplied with a relatively lower voltage potential while the remaining contact elements are supplied with relatively higher voltage potentials.

The manner in which the illustrated automatic actuator operates in response to postage data supplied thereto by an automatic postage scale now will be described. Initially it is assumed that carriage 2 is disposed at its start position whereby the contacts of limit switch 60 are closed and the contacts of limit switch 62 are opened. Let it be further assumed that the automatic postage scale has computed the postage for the article to be shipped at $1.75. Accordingly, digital data, such as BCD data, corresponding to the digit 5 is applied to converter 74a, BCD data corresponding to the digit 7 is applied to converter 74b, BCD data corresponding to the digit 1 is applied to converter 74c and BCD data corresponding to the digit 0 is applied to converter 74d. Consistent with this supplied BCD data, converter 74a produces a relatively low voltage potential at its decimal output terminal 5 (not shown), converter 74b produces a relatively low voltage potential at its decimal output terminal 7 (not shown), converter 74c produces a relatively low voltage potential at its decimal output terminal 1 (not shown) and converter 74d produces a relatively low voltage potential at its decimal output terminal 0. Thus, contact elements $72a_5, 72b_7, 72c_1$ and $72d_0$ are supplied with relatively low voltage potentials by converters 74a, 74b, 74c and 74d, respectively, while the remaining contact elements are provided with relatively high voltage potentials.

Once the foregoing predetermined voltage potentials are applied to the respective contact elements 72, motor control circuit 58 is conditioned to drive motor 48. If desired, a "start" signal may be applied directly to motor control circuit 58 by the apparatus illustrated in FIG. 5 or, alternatively, a suitable START switch (not shown) can be actuated. The "start" signal or actuation of the START switch can be used to effectively "latch" the data applied to converter 74. When motor 48 is energized, pulley 52 and lead screw 20 rotate to drive carriage 2 in its forward direction. As carriage 2 is driven forward, movable contacts 68a, 68b, 68c and 68d scan each of the contact elements included in the rows of contact elements 72a, 72b, 72c and 72d, respectively. When the 0 series of contact elements is scanned, that is, when each of movable contacts 68a, 68b, 68c and 68d are in contact with contact elements $72a_0$, $72b_0$, $72c_0$ and $72d_0$, transistors 76a, 76b, and 76c are turned on but transistor 76d is turned off. This is because contact element $72d_0$ is supplied with a relatively low voltage potential, whereas the remaining contact elements in the 0 series are supplied with relatively higher voltage potentials. Consequently, coil 26d is de-energized and a magnetically attractive force no longer is exerted on elongated member 30d. Therefore, as carriage 2 continues to move forwardly, contact element 30d pivots out of driving engagement with its associated selector lever 6d, as shown in FIG. 4, and the remaining elongated members 30a, 30b and 30c drive their respective selector levers 6a, 6b and 6c, respectively. Thus, it is seen that selector lever 6d is positioned at its 0 location.

As carriage 2 continues to move forwardly, elongated members 30a, 30b and 30c drive, or push, their respective selector levers 6a, 6b and 6c to the 1 location on postage meter 5. At that time, movable contacts 68 are in electrical contact with the 1 series of contact elements 72. Since a relatively low voltage potential has been assumed to be applied to contact element $72c_1$, transistor 76c is turned off and coil 26c is de-energized. Hence, as carriage 2 continues to move forwardly, elongated member 30c pivots about pivot bar 40, as shown in FIG. 4, because of the resistive force exerted on roller 36c by selector lever 6c. Selector lever 6c thus remains at its 1 location on postage meter 5.

As carriage 2 continues to move forwardly, movable contacts 68 continue to scan the rows of contact elements 72 until the movable contacts reach the 5 series. At that time, selector levers 6a and 6b both will be positioned at the 5 location. The relatively low voltage potential applied to contact element $72a_5$ turns off transistor 76a which, in turn, de-energizes coil 26a. Hence, elongated member 30a pivots about pivot bar 40 when carriage 2 continues to move, thereby maintaining selector lever 6a at its 5 location.

As is now appreciated, when carriage 2 advances until selector lever 6b is at its 7 location and the movable contacts are in contact with the 7 series of contact elements 72, transistor 76b is turned off to de-energize coil 26b. Accordingly, selector lever 6b remains positioned at its 7 location on postage meter 5 while carriage 2 continues to move forwardly.

It may be appreciated that after an electromagnet 24 is de-energized, it subsequently may be re-energized. However, this has no affect upon its associated elongated member 30 which had been pivoted out of driving engagement when the electromagnet had been de-energized. Thus, each of the movable contacts 68 may be resupplied with a relatively higher voltage potential after passing over the particular contact whereat the relatively lower voltage potential had been applied without disturbing the already pivoted elongated member.

When carriage 2 reaches its end position, the contacts of normally closed limit switch 60 open and motor control circuit 58 is conditioned to de-energize motor 48, whereby the carriage is halted. Preferably, and in order to avoid unnecessary mechanical loading of motor 48, lead screw 20 may be adapted to free-wheel when the motor is de-energized. When carriage 2 thus reaches its end position, each of selector levers 6a, 6b, 6c and 6d will be disposed in their predetermined monetary unit locations on postage meter 5, as determined by the postage data produced by the automatic postage scale. That is, postage meter 5 is conditioned to provide a postage notation of $1.75. This postage notation may be printed by postage meter 5, as on a suitable label, by activating a print switch 65 normally provided on the postage meter. Alternatively, a "print" signal may be produced when the contacts of limit switch 60 open, indicative of the arrival of carriage 2 at its end position. In either embodiment, the closure of print switch 65 or the production of a "print" signal results in the printed postage label by postage meter 5. Concurrently therewith, reset switch 64 is operated. This may be achieved by, for example, mechanically ganging print switch 65 and reset switch 64. Of course, other alternatives are contemplated for actuating reset switch 64 once the postage label has been printed.

When reset switch 64 is operated, the contacts of limit switch 60 are opened and the contacts of normally closed limit switch 62 are closed, motor control circuit 58 is enabled to energize motor 48 in its opposite direction. Accordingly, pulley 52 and lead screw 20 are rotated to drive carriage 2 rearwardly from its end position to its initial, or start, position. It is recalled that, as carriage 2 returns to its initial position, reset bar 42 follows the carriage to return each actuated lever 6 to its initial position, for example, to its 0 location. When carriage 2 approaches its start position, projecting members 56a, 56b, 56c and 56d contact rollers 36a, 36b, 36c and 36d on pivoted elongated members 30a, 30b, 30c and 30d, respectively. As shown in FIG. 4, further movement of carriage 2 drives rollers 36a, 36b, 36c and 36d downwardly along projecting members 56a, 56b, 56c and 56d, respectively, to return the elongated members 30a, 30b, 30c and 30d to their driving, or upright, configuration. Hence, when carriage 2 reaches its start position, the contacts of normally closed limit switch 62 open to condition motor control circuit 58 to de-energize motor 48 and each of elongated members 30 is in its upright position prepared for a subsequent selector lever actuating operation.

The foregoing operation is repeated for each postage computation produced by the automatic postage scale which is connected to converter circuits 74.

Although the foregoing has described electromagnetic elements 4 as comprising electromagnets 24, in an alternative embodiment the electromagnets may be replaced by solenoids. In this alternative embodiment, the solenoid armature is connected to the upper end portion of elongated member 30. When the armature is retracted, or pulled in, elongated member 30 is disposed in its driving configuration as described above. Conversely, when the solenoid armature is withdrawn, elongated member 30 is pivoted out of its driving configuration. Hence, the operation of this alternative embodiment is substantially similar to that described hereinabove. In controlling the selective operation of these solenoids, the signals described hereinabove in respect to FIG. 5 may be used, provided the solenoid armature is adapted to be withdrawn when the solenoid is de-energized. Alternatively, if the solenoid armature is withdrawn only when the solenoid is energized, converters 74 may be adapted to supply a relatively high voltage potential to only a predetermined one contact element in each row of contact elements 72 to correspondingly selectively energize the respective solenoids.

Although the automatic actuator of the present invention is readily adapted to cooperate with an automatic postage scale, it should be appreciated that the postage data supplied to converters 74 may be derived from any suitable source of postage data.

Figure 6:
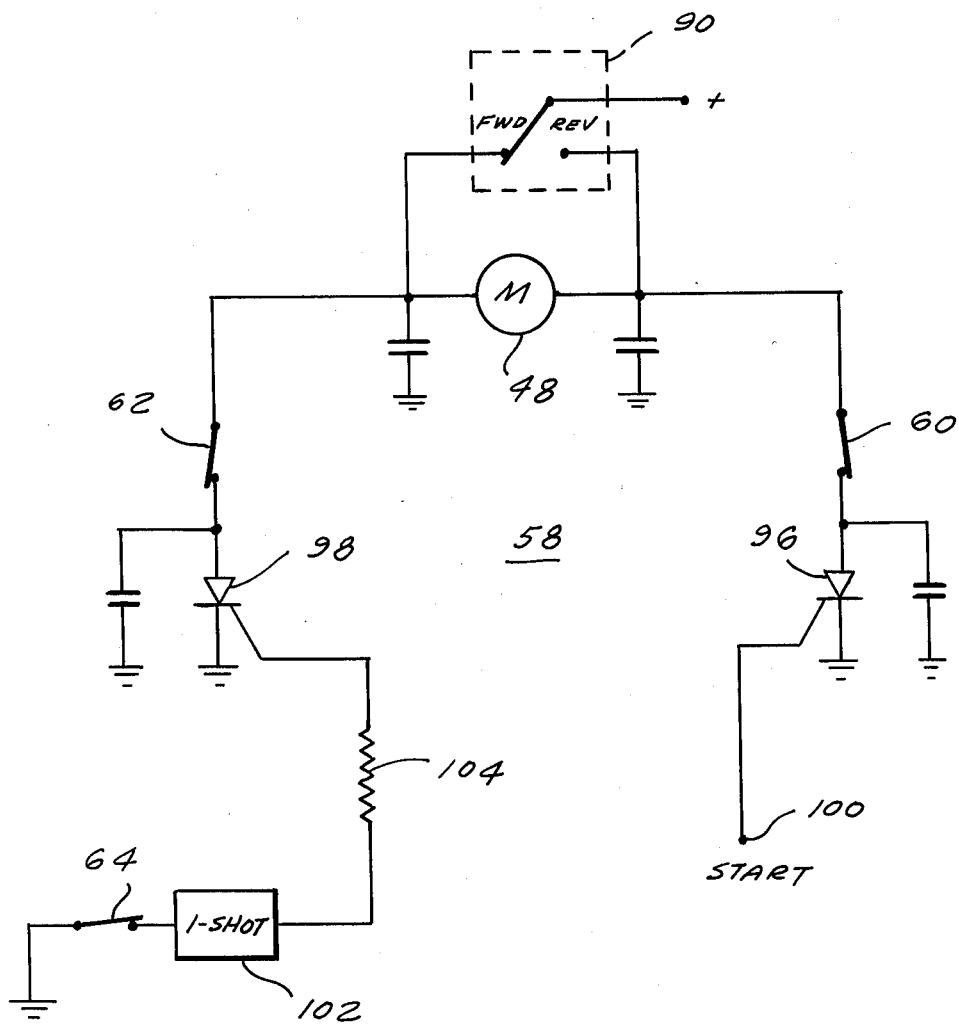
FIG. 6 is a schematic diagram of one embodiment of a motor control circuit that can be used with the automatic actuator apparatus.

Motor control circuit 58 is shown in greater detail in FIG. 6 and includes the aforedescribed switches 60, 62, 64 and 90 and, in addition, electronic switches 96 and 98 and a one-shot pulse generating circuit 102. Switch 90, which is seen to be a changeover switch, is adapted to complete a circuit, when in its "forward" position, from a source of operating voltage, through motor 48, through normally closed switch 60, and through electronic switch 96 to ground. Preferably, electronic switch 96 is a silicon controlled rectifier (SCR) whose gate, or control, electrode is adapted to be supplied with the aforementioned "start" signal, or its equivalent if a START switch (not shown) is actuated, through terminal 100. When switch 90 is in its "reverse" position, a circuit is completed from the source of operating voltage, through motor 48, through normally closed switch 62 and through SCR 98 to ground. The gate electrode of SCR 98 is adapted to be supplied with an energizing pulse from one-shot circuit 102 through resistor 104. The one-shot circuit is of the type capable of generating a pulse when ground potential first is applied thereto. Hence, one-shot circuit 102 is coupled to ground through normally closed reset switch 64 to generate an energizing pulse when switch 64 is opened and then closed.

When carriage 2 is at its start position, abutment 92 closes switch 90 to its "forward" position and normally closed switch 60 is closed. SCR is turned on in response to a "start" signal or equivalent applied to terminal 100 and motor 48 is energized to drive carriage 2 forwardly. When the carriage reaches its end position, switch 60 opens to de-energize motor 48 and abutment 94 closes switch 90 to its "reverse" position immediately thereafter. Then, when reset switch 64 is opened and closed, one-shot circuit 102 generates an energizing pulse to turn SCR 98 on. Current then flows from switch 90 through motor 48, through normally closed switch 62, and through SCR 98 to energize the motor, whereby carriage 2 is driven rearwardly. When the carriage then reaches its start position, normally closed switch 62 opens to deenergize motor 48 and, immediately thereafter, switch 90 closes to its "forward" position. Hence, the illustrated apparatus is ready for re-use.

Figure 7:
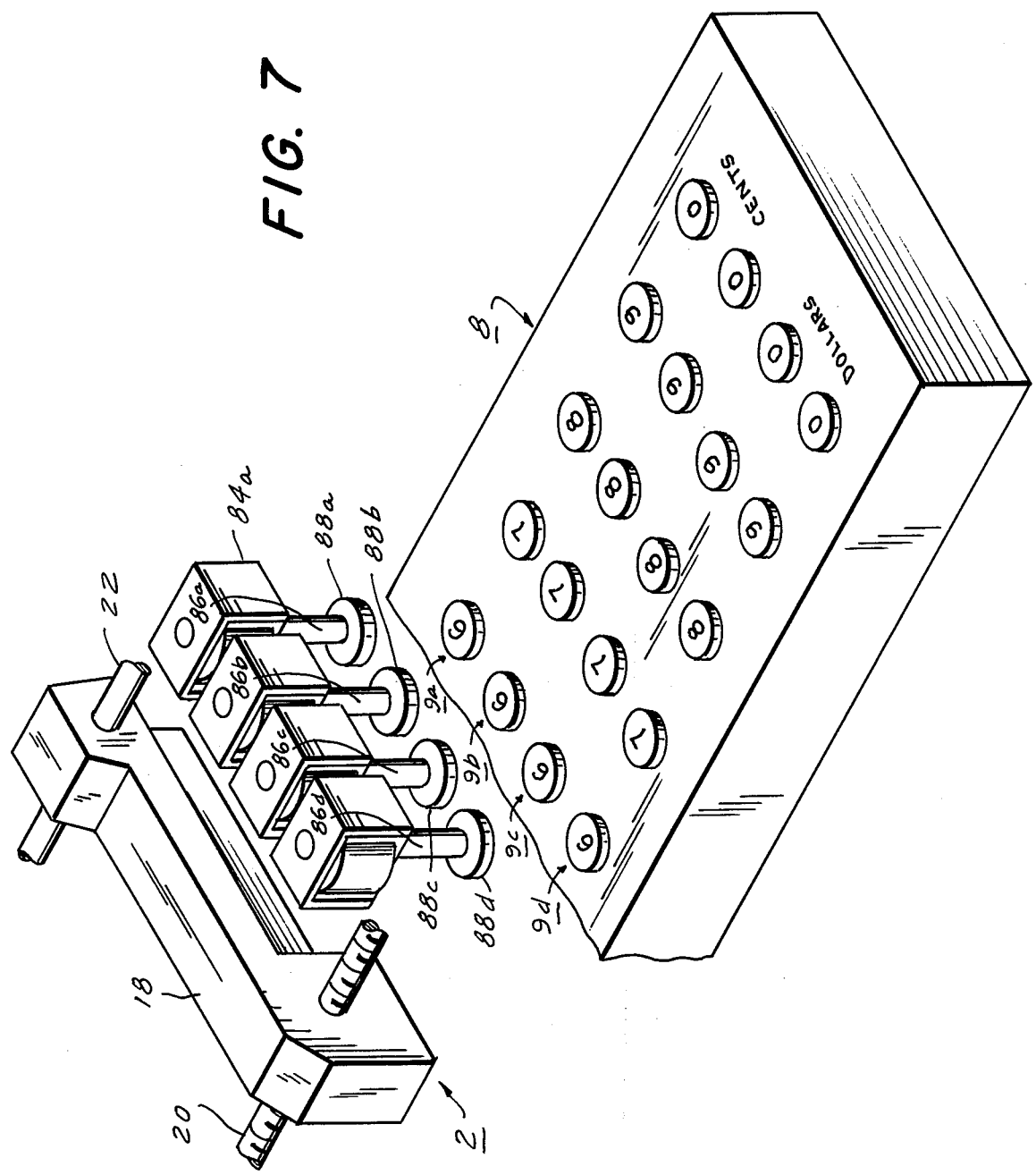
FIG. 7 is an exploded perspective view of another embodiment of the automatic actuator apparatus of this invention.

The embodiment depicted in FIGS. 1-4 has been described in conjunction with a postage meter of the type having individually movable selector levers, such as the postage meter manufactured by Pitney-Bowes Corporation, Stamford, Conn. The present invention also can be used to automatically actuate a postage meter 8 of the type having an array of individually operable selector key elements 9, such as shown in FIG. 7. Postage meter 8 is of a type manufactured by the Friden Division of Litton Corporation. Although postage meter 8 (FIG. 7) differs from postage meter 5 (FIGS. 1-4) in that individual selector key elements 9a, 9b, 9c and 9d are provided rather than individually movable selector levers 6a, 6b, 6c and 6d, nevertheless, the teachings of the present invention are readily applicable to postage meter 8. In particular, electromagnets 24a, 24b, 24c 1 and 24d (FIG. 1) are replaced by solenoids 84a, 84b, 84c and 84d, respectively, as shown in FIG. 7. Also, elongated members 30 which comprise activator elements 3 in FIG. 1 are replaced by solenoid armatures 86 which terminate in respective actuator members 88a, 88b, 88c and 88d. Of course, since pivotable elongated members are not used in the FIG. 7 embodiment, reset support member 54 and projecting members 56 can be omitted.

When used with postage meter 8, it is appreciated that, as carriage 2 moves forwardly from its start position toward its end position, solenoids, 84a, 84b, 84c and 84d are selectively energized in accordance with the postage data supplied by the apparatus shown in FIG. 5, thereby to selectively depress corresponding ones of selector key elements 9a, 9b, 9c and 9d. The manner in which these solenoids are selectively operated is substantially similar to that described previously in connection with the contemplated replacement of electromagnets 24 by solenoids. Accordingly, in the interest of simplification, further description of the FIG. 7 embodiment need not be provided.

While the present invention has been particularly shown and described with reference to preferred embodiments thereof, it is appreciated that various modifications and changes in form and details can be made without departing from the spirit and scope of the invention. For example, a detecting circuit may be provided to detect when the digitized postage data supplied to, for example, converter circuits 74 exceeds a predetermined postage value. This detector circuit can be used to inhibit operation of automatic actuator 1 in the event that the postage meter is not to be operated to print such postage. This detector circuit can be used, for example, to prevent unauthorized or unwarranted operation of the postage meter.

As a further modification, alternative data supply apparatus can be used in place of segmented contacts 70, shown in FIG. 5. For example, conventional photosensing apparatus, such as an LED in combination with a phototransistor, can be provided to sense the position of each selector lever 6 as each lever is driven by activator elements 3. When the selector lever reaches a predetermined position, corresponding to a particular monetary unit position on postage meter 5, this is detected by the photosensing apparatus to de-energize the associated electromagnet or, alternatively, to activate the associated solenoid. Similarly, the photosensing position sensor can be replaced by a magnetic position sensor, such as a Hall effect device which cooperates with a magnetic element that may be placed on each of selector levers 6.

As a still further alternative embodiment to the use of segmented contacts 70, the position of carriage 2, and thus the position of each of selector levers 6, can be detected by, for example, counting the number of revolutions of lead screw 20. That is, since the number of revolutions of the lead screw is directly related to the positioning of carriage 2, such a count will represent the position of each activator element. Then, the proper electromagnet or solenoid can be operated so that the corresponding selector lever, or selector key element, is properly positioned. Analogous to the counting of revolutions of lead screw 20, motor 48 may be a stepper motor driven by stepping pulses, and the number of stepping pulses can be counted. As is appreciated, the stepper pulse count is indicative of the position of carriage 2 and, therefore, the position of selector levers 6.

Also, although carriage 2 has been shown as traveling in a linear path, suitable guide shafts or guide tracks may be provided to enable the carriage to travel in a circular path so as to be compatible with postage selector levers in other types of postage meters not shown herein.

Therefore, it is intended that the appended claims be interpreted as including the foregoing as well as various other such changes and modifications in form and detail of the aforedescribed invention.

What is claimed is:

1. Apparatus for automatically actuating manually operable selector means, comprising:
   a carriage movable between first and second positions;
   plural energizable actuator means supported on and movable with said carriage;
   energizing means for selectively energizing said plural actuator means while said carriage is moved between said first and second positions to correspondingly move said selector means to predetermined positions intermediate said first and second positions whereupon said energizing means selectively de-energizes said actuator means while said carriage continues to move; and
   reset means to reset said carriage at said first position and to reset all of said selector means after said selector means have been activated.

2. The apparatus of claim 1 wherein said selector means comprises plural levers independently movable to any one of preselected positions intermediate said first and second positions; said actuator means comprises a respective finger for each lever and said energizing means comprises control means for positioning each finger in driving engagement with its associated lever as said carriage moves until said associated lever reaches its preselected position whereupon said finger is disengaged from its associated lever.

3. The apparatus of claim 1 further comprising motor means for driving said carriage from said first position to said second position thereby to enable said selector means to be selectively moved, and for driving said carriage from said second position to said first position.

4. Apparatus for automatically actuating manually operable selector means, comprising:
   a carriage movable between first and second positions;
   plural energizable actuator means supported on and movable with said carriage;
   energizing means for selectively energizing said plural actuator means while said carriage is moved between said first and second positions to correspondingly activate said selector means at predetermined positions intermediate said first and second positions;
   reset means to reset said carriage at said first position and to reset all of said selector means after said selector means have been activated;
   motor means for driving said carriage from said first position to said second position thereby to enable said selector means to be selectively activated, and for driving said carriage from said second position to said first position; and wherein said motor means includes a bi-directional motor; and motor control means comprising direction determining switch means coupled to said motor, a forward drive circuit coupled to said motor for forward energizing current to flow therethrough, and a reverse drive circuit coupled to said motor for reverse energizing current to flow therethrough.

5. The apparatus of claim 4 wherein said direction determining switch means comprises a change-over switch mounted on said carriage and closed to a forward drive position when said carriage is at said first position and to a reverse drive position when said carriage is at said second position.

6. The apparatus of claim 5 wherein said forward drive circuit comprises a normally closed first limit switch connected in series with a first electronic switch to establish a forward energizing current path through said change-over switch and said motor until said carriage reaches said second position to open said first limit switch; and wherein said reverse drive circuit comprises a normally closed second limit switch connected in series with a second electronic switch to establish a reverse energizing current path through said change-over switch and said motor until said carriage reaches said first position to open said second limit switch.

7. Apparatus for automatically actuating manually operable selector means, wherein said selector means comprises columns of actuable key elements; comprising:
   a carriage movable between first and second positions;
   plural energizable actuator means supported on and movable with said carriage;
   energizing means for selectively energizing said plural actuator means while said carriage is moved between said first and second positions to correspondingly activate said selector means at predetermined positions intermediate said first and second positions;
   reset means to reset said carriage at said first position and to reset all of said selector means after said selector means have been activated;
   and said actuator means comprising a respective activator for each column, and control means for selectively energizing each activator when said carriage moves to position said activator in actuating relation with a key element in a predetermined position in its respective column.

8. The apparatus of claim 7 wherein said control means comprises a respective solenoid for each activator; and means for selectively operating each said solenoid.

9. The apparatus of claim 8 wherein said selectively operating means comprises data supply means for supplying to said solenoids data representing the predetermined key elements in positions in said columns whereat said respective solenoids are operated.

10. The apparatus of claim 9 wherein said data supply means includes a plurality of groups of contacts, each group being associated with a respective solenoid and being comprised of contacts aligned with said key element positions for supplying an operating signal at a particular one contact in said group; and each of said solenoids includes a movable contact in electrical contact with its associated group of electrical contacts for applying the operating signal to said solenoid when said movable contact reaches said particular contact.

11. Apparatus for automatically actuating manually operable selector means of the type having plural levers independently movable to any one of preselected positions intermediate first and second positions, comprising:
- a carriage movable between said first and second positions;
- plural actuator means coupled to and movable with said carriage, said actuator means comprising a respective finger for each lever, and an electromagnetic element for each finger;
- means for selectively operating each electromagnetic element for positioning its associated finger in driving engagement with an associated lever while said carriage moves between said first and second positions until said associated lever reaches its preselected position whereupon said finger is disengaged from said associated lever; and
- reset means to reset said carriage at said first position following the activation of said selector means.

12. The apparatus of claim 11 wherein said selectively operating means comprises data supply means for supplying to said electromagnetic elements data representing the preselected position whereat a predetermined electromagnetic element is operated to disengage its respective finger from said associated lever.

13. The apparatus of claim 12 wherein said data supply means includes a plurality of groups of electrical contacts, each group being associated with a respective electromagnetic element and being comprised of contacts aligned with said preselected positions of a lever for supplying an operating signal at a particular one contact in said group; and said electromagnetic elements each includes a movable contact in electrical contact with its associated group of electrical contacts for applying the operating signal to said electromagnetic element when said movable contact reaches said particular contact.

14. The apparatus of claim 11 wherein said electromagnetic element is an electromagnet normally energized to maintain its respective finger in driving engagement with its associated lever and de-energized when said associated lever reaches said preselected position.

15. The apparatus of claim 14 wherein each finger comprises an elongated member having a first end portion adapted to be magnetically attracted by its respective electromagnet; a second end portion adapted to drive its associated lever and an intermediate portion pivotally connected to said carriage.

16. The apparatus of claim 15 wherein said reset means includes plural projecting members fixedly disposed at said first position, each projecting member being aligned with a respective elongated member to pivot same when said carriage is reset at said first position such that said elongated member is returned to a position adapted to drive its associated lever.

17. The apparatus of claim 16 wherein said reset means further includes a reset bar coupled to and movable with said carriage for returning all of said levers to an initial position while said carriage moves between said second and first positions.

18. Apparatus for automatically operating a manually operable postage meter of the type having selector elements arranged in columns and movable to preselected positions to represent monetary units of postage, said apparatus comprising:
- a carriage movable between an initial start position and an end position;
- plural energizable actuator means supported on and movable with said carriage;
- energizing means for selectively energizing said actuator means while said carriage moves between said start and end positions so as to selectively position said actuator means in operable relation to said selector elements to move said selector elements to said preselected positions before said carriage reaches said end position and thereby condition said postage meter to provide a corresponding indication of postage; and
- means to reset said carriage at said start position and to operate said postage meter to produce a postage notation following the selective operation of said selector elements.

19. The apparatus of claim 18 wherein said actuator means comprises a respective activator for each selector element column; and said energizing means comprises control means for selectively energizing a particular activator when said carriage moves to a position corresponding to a monetary unit included in said postage indication.

20. The apparatus of claim 18 further comprising motor means coupled to said carriage for transporting said carriage from said start position to said end position during which movement said postage meter is conditioned, and to return said carriage from said end position to said start position during which movement said postage meter is reset to an initial condition.

21. The apparatus of claim 20 wherein said means to operate said postage meter comprises switch means energized when said carriage is at said end position to actuate said motor means for returning said carriage to said start position and to actuate printer means included in said postage meter to print the postage notation corresponding to said selectively operated selector elements.

22. Apparatus for automatically operating a manually operable postage meter of the type having selector elements arranged in columns and operable to represent monetary units of postage, said apparatus comprising:
- a carriage movable between an initial start position and an end position;
- plural actuator means coupled to and movable with said carriage, said actuator means comprising a respective activator for each selector element column;
- a respective electromagnetic element for each activator, said electromagnetic element being coupled to said carriage;
- means for selectively operating each said electromagnetic element when said carriage moves to a position between said start and end positions corresponding to a monetary unit of said postage so as to correspondingly control said activators to operate said selector elements and condition said postage meter to provide a corresponding indication of postage; and
- means to reset said carriage at said start position and to operate said postage meter to produce a postage notation following the selective operation of said electromagnetic elements.

23. The apparatus of claim 22 wherein said selectively operating means comprises data supply means for supplying to said electromagnetic elements data representing the postage monetary unit positions in said columns such that when said carriage reaches each said position a corresponding electromagnetic element is operated.

24. The apparatus of claim 23 wherein said data supply means includes a plurality of rows of electrical contacts, each contact row being associated with a respective electromagnetic element and being comprised of contacts associated with monetary unit positions, respectively, for supplying an operating signal at a particular one contact in said contact row; and said electromagnetic elements each includes a movable contact in electrical contact with its associated contact row for applying the operating signal to said electromagnetic element when said movable contact reaches said particular contact.

25. The apparatus of claim 24 wherein said selector elements are levers independently movable to positions representing monetary units; and each activator comprises a finger adapted to be positioned by its associated electromagnetic element in driving engagement with a respective lever as said carriage moves until said lever reaches a predetermined monetary unit position whereat said associated electromagnetic element is operated to disengage said finger from its lever.

26. The apparatus of claim 25 wherein said electromagnetic element is an electromagnet normally energized to maintain its respective finger in driving engagement with its associated lever and de-energized in response to said operating signal.

27. The apparatus of claim 26 wherein each finger comprises an elongated member having a first end portion adapted to be magnetically attracted by its respective electromagnet; a second end portion adapted to drive its associated lever; and an intermediate portion about which said elongated member pivots.

28. The apparatus of claim 27 wherein said means to reset said carriage includes a plurality of projecting members fixedly disposed at said start position, each projecting member being aligned with a respective elongated member to pivot same when said carriage is reset at said start position such that said elongated member is returned to a position adapted to drive its associated lever.

29. The apparatus of claim 28 wherein said means to reset said carriage further includes a reset bar coupled to and movable with said carriage for returning all of said levers to an initial position while said carriage moves from said end position to said start position.

30. The apparatus of claim 24 wherein said selector elements are depressible keys arranged as an array of columns of keys; and each activator comprises an armature adapted to depress a predetermined key in an associated column when said carriage reaches a position corresponding to the monetary unit position whereat said predetermined key is located at which said associated electromagnetic element is operated.

31. The apparatus of claim 30 wherein each said electromagnetic element is a solenoid.

* * * * *